(12) United States Patent
Gale et al.

(10) Patent No.: US 8,736,224 B2
(45) Date of Patent: May 27, 2014

(54) CHARGING A BATTERY USING A CIRCUIT HAVING SHARED LOADS

(75) Inventors: Allan R. Gale, Livonia, MI (US); Michael W. Degner, Novi, MI (US); Michael A. Tamor, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 1880 days.

(21) Appl. No.: 11/716,152

(22) Filed: Mar. 9, 2007

(65) Prior Publication Data
US 2008/0218121 A1    Sep. 11, 2008

(51) Int. Cl.
*H02J 7/14*    (2006.01)

(52) U.S. Cl.
USPC .......................................... 320/104; 307/149

(58) Field of Classification Search
USPC ........................... 320/104, 116, 149; 307/149
See application file for complete search history.

(56) References Cited

U.S. PATENT DOCUMENTS

| | | | |
|---|---|---|---|
| 3,767,998 A | 10/1973 | Beling | |
| 4,935,642 A | 6/1990 | Obelode et al. | |
| 5,369,352 A | 11/1994 | Toepfer et al. | |
| 5,982,643 A | 11/1999 | Phlipot | |
| 6,496,345 B1 | 12/2002 | Smith | |
| 2004/0155624 A1* | 8/2004 | Amano et al. | 320/104 |
| 2004/0169489 A1* | 9/2004 | Hobbs | 320/104 |
| 2005/0280399 A1 | 12/2005 | Karner et al. | |
| 2006/0126247 A1 | 6/2006 | Fan | |

* cited by examiner

*Primary Examiner* — Yalkew Fantu
(74) *Attorney, Agent, or Firm* — David B. Kelley; MacMillan, Sobanski & Todd, LLC

(57) ABSTRACT

A method for charging an electric storage battery in a plug-in hybrid electric vehicle through a power supply circuit, includes coupling the charger to the circuit, determining whether another appliance in the circuit other than the charger is drawing current, determining a maximum charge rate at which the battery can be charged using the charger, charging the battery at the maximum charge rate if no other appliance in the circuit is drawing current, and charging the battery at less than the maximum charge rate if another appliance in the circuit is drawing current.

15 Claims, 5 Drawing Sheets

CHARGING A BATTERY USING A CIRCUIT HAVING SHARED LOADS

BACKGROUND OF THE INVENTION

1. Field of the Invention

This invention relates generally to a system and method for recharging an electric storage battery using a charger coupled to a power supply circuit that may have a current-drawing appliance in the circuit.

2. Description of the Prior Art

A hybrid vehicle is a vehicle that uses two distinct power sources, such as an on-board rechargeable energy storage system and a fueled power source for vehicle propulsion. The term hybrid vehicle most commonly refers to hybrid-electric vehicle (HEV), which use internal combustion engines and electric batteries to power electric motors. Generally, kinetic energy of the vehicle is recovered during braking, converted to electric energy and stored in one of the batteries.

A plug-in hybrid electric vehicle (PHEV) is a hybrid, which has additional battery capacity and the ability to be recharged from an external electrical outlet supplied by a public utility power grid. The vehicle can be used for short trips of moderate speed without needing the internal combustion engine (ICE) component of the vehicle's power train, thereby saving fuel costs. In this mode of operation, the vehicle operates as a pure battery electric vehicle, but the long range and additional power of the ICE power train is available when needed. PHEVs are commonly called "grid-connected hybrids."

PHEVs require the user of its battery charging system to plug a vehicle charger into an AC outlet. In many cases this outlet is one of several on the same circuit breaker. To charge the vehicle's battery it is desirable to draw the maximum continuous current, at which the circuit is rated. However if other appliances are also connected to the same circuit, the maximum amount of available charger current is reduced. In this case, the charger could easily exceed the circuit maximum current draw and open a circuit breaker or fuse in the circuit resulting in no charge to the battery.

There is a need in the industry to detect the presence of other loads on the same circuit in addition to the charger so that the charger could reduce its load on the circuit, thereby reducing or eliminating the probability that the circuit breaker will open the circuit due to charging the battery.

SUMMARY OF THE INVENTION

A method for charging an electric storage battery in a plug-in hybrid electric vehicle through a power supply circuit, includes coupling the charger to the circuit, determining whether another appliance in the circuit other than the charger is drawing current, determining a maximum charge rate at which the battery can be charged using the charger, charging the battery at the maximum charge rate if no other appliance in the circuit is drawing current, and charging the battery at less than the maximum charge rate if another appliance in the circuit is drawing current.

A system for charging the electric storage battery includes a power supply circuit having a first outlet at which a charger is coupled to the circuit and a second outlet at which an appliance other than the charger can be coupled to the circuit, an instrument for measuring circuit operating variables that indicate whether an appliance in the circuit other than the charger is drawing current, and a charger in communication with the instrument, coupled to the battery and configured to vary the time rate at which the battery is charged depending on a magnitude of the operating variable of the circuit measured by the instrument.

The charger changes the rate at which the battery is being charged in accordance with the magnitude of current drawn by an appliance in the circuit. Alternately, the charger allows the full charge rate capacity to be used to charge the battery when no appliance in the circuit other than the charger is drawing current. This minimizes the length of the charging period.

The charger determines the length of a reference period during which the battery can be charged, continues charging the battery while the reference period is unexpired, and discontinues charging the battery when the reference period expires.

The charger determines the current state of charge of the battery, charges the battery while the current state of charge is less than a reference state of charge, and discontinues charging the battery when the current state of charge is equal to or greater than the reference state of charge. These features permit automatic charging of the battery without requiring oversight by the user.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
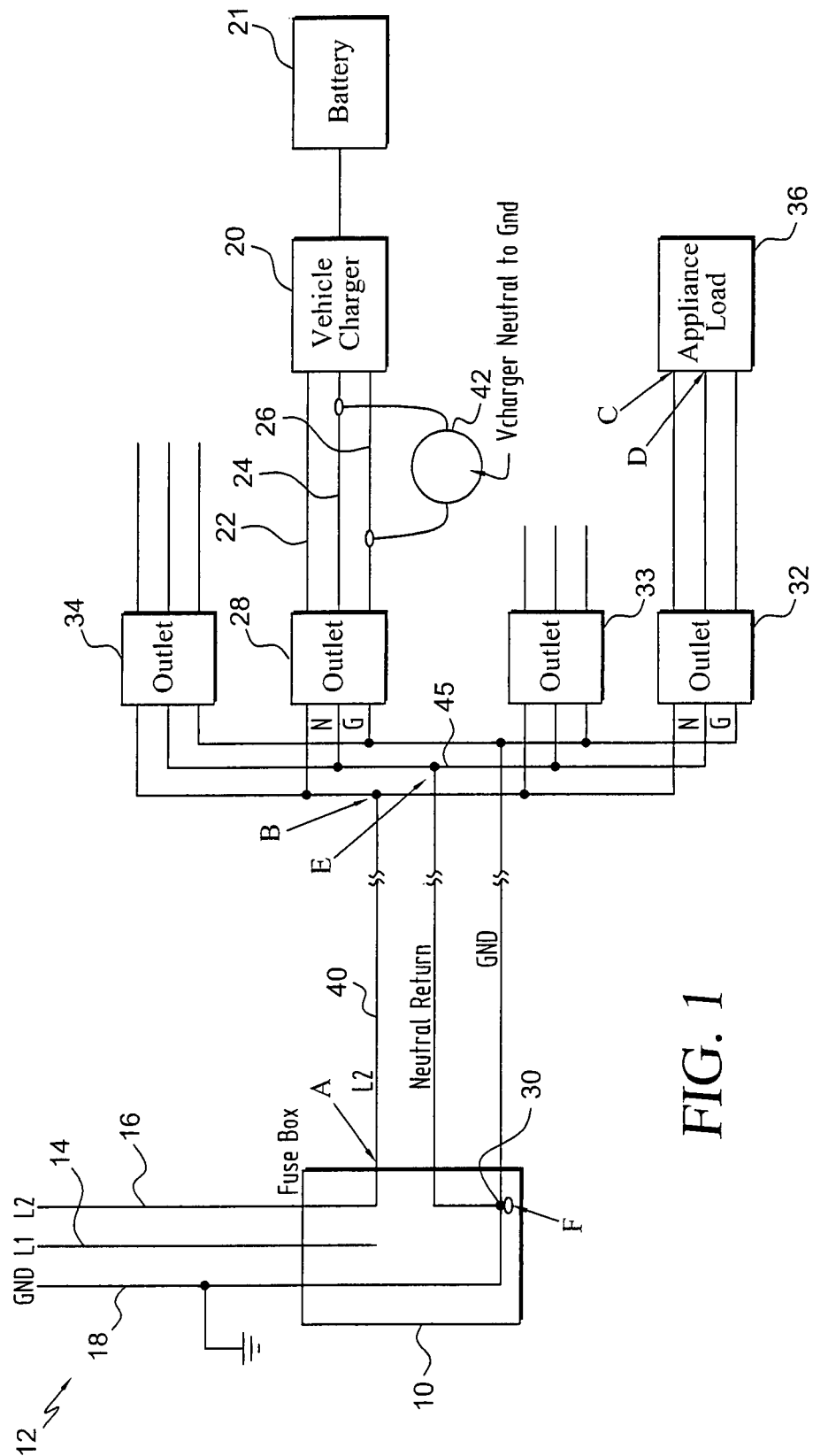
FIG. 1 is a schematic diagram of a typical electrical distribution system to which a charger can be connected.

Referring to FIG. 1, ac electric power from a electric utility power grid is carried to a circuit distribution panel 10 of a residential location on a supply circuit 12, which includes ac phase wire 14 (shown on the L1 phase), phase wire 16 (shown on the L2 phase) and ac ground wire 18. The ac line supplying power to a charger 20, which is used to recharge an electric storage battery 21 of an electric vehicle such as a PHEV, should include a minimum of three wires including a phase wire, such as phase wire 22 shown on phase L2, ac return 24 (neutral) and ac ground 26. Wire 22 is electrically coupled through an electrical receptacle or outlet 28 and circuit distribution panel 10 to wire 16. Neutral wire 24 is electrically coupled through the outlet 28 and terminal 30 in circuit distribution panel 10 to ground wire 18. Ground wire 26 is electrically coupled through the outlet 28 and terminal 30 in circuit distribution panel 10 to ground wire 18. AC ground is intended to conduct no current during normal operation and will have no voltage drop.

Additional outlets 32-34, provided for other appliances 36, are connected to circuit 12 similarly to the connections between outlet 28 and circuit 12. Current drawn from the ac circuit 12 by another appliance 36 will result in a voltage drop on the ac lines 22 and 24 in proportion to the magnitude of the current drawn by appliance 36. This voltage drop is caused by electrical resistance of the electrical wiring. This resistance is dependent on the length of the wire and the diameter of the wire or its gauge.

In FIG. 1, the total wiring voltage drop for the appliance load 36 will be the sum of the voltage drops along the path of current flow from the circuit distribution panel 10 to the appliance load 36 and back to the circuit distribution panel $$V_{wire} = V_{AB} + V_{BC} + V_{CD} + V_{DE} + V_{EF}$$

If the neutral-to-ground charger voltage ($V_{charger\ Neutral\ to\ Ground}$) is measured while the charger is not drawing current, only the current path that is shared with the current drawing appliance 36 will have a voltage drop. That portion is $V_{EF}$ and can be used as an indication to reduce the charge current draw to a lower level to prevent a circuit breaker from opening or to notify the operator that there is another load present on the line.

A voltage measuring instrument 42 is shown in FIG. 1 measuring the voltage between the neutral and ground terminals of the outlet 28 where charger 20 is coupled to circuit 12.

Figure 2:
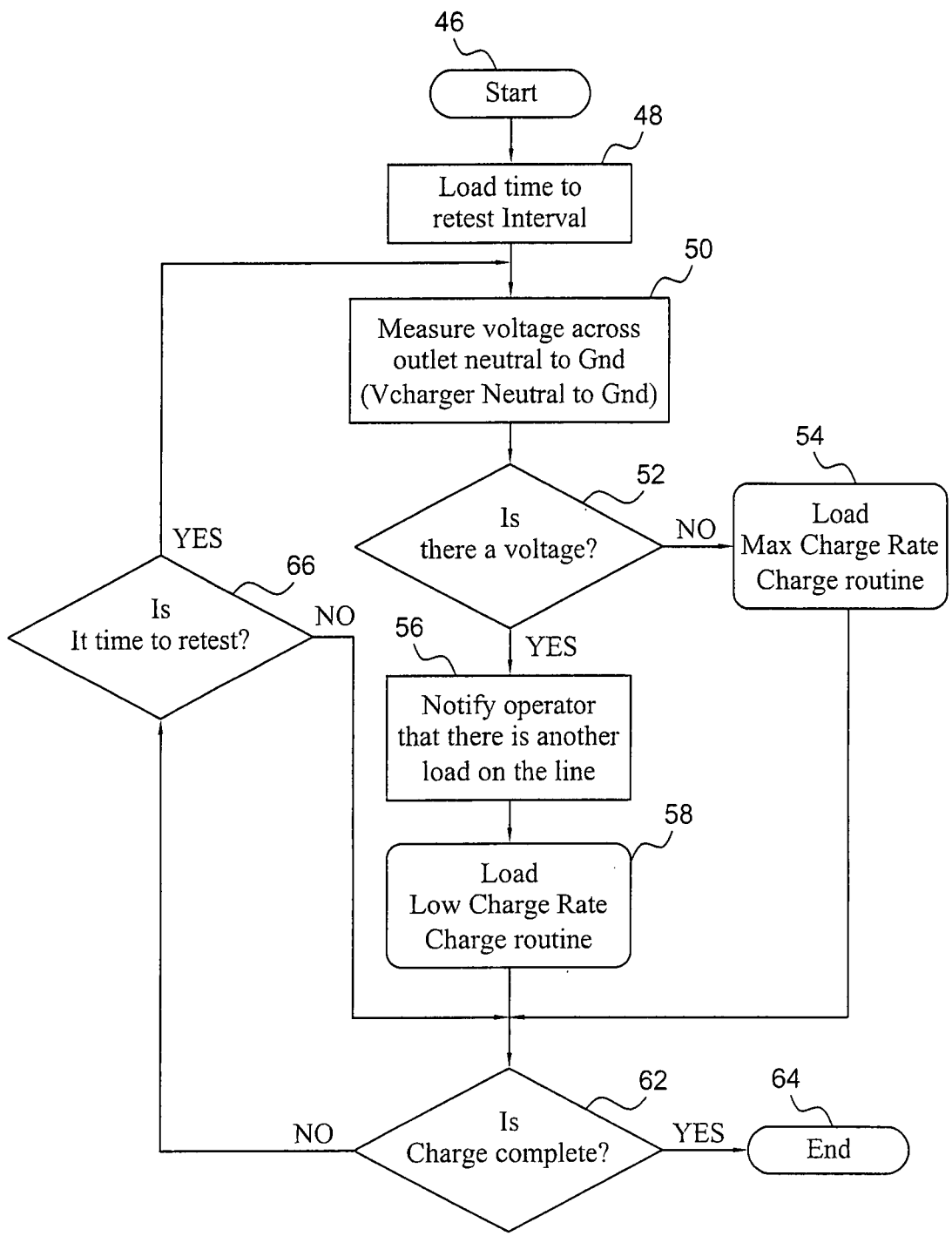
FIG. 2 is a schematic diagram illustrating the steps of a method for charging an electric storage battery through a charger connected to an electric power utility grid.

FIG. 2 illustrates a method for periodically checking the line load while recharging an electric storage battery and selecting alternative recharge rates based on the presence or absence of the voltage at the outlet or wall plug 28 measured between the neutral and ground ($V_{charger\ Neutral\ to\ Ground}$), as discussed with reference to FIG. 1. The operator is notified if additional loads are drawing current in the supply circuit.

The recharge procedure begins at 46 when the charger 20 is coupled to the electric power supply circuit 12 by plugging it into the receptacle at outlet 28. At 48, an interval timer is loaded with the predetermined length of a period that will expire before several retests of the voltage in the supply circuit are made, as described below.

At step 50, voltage is measured across the neutral to ground wires at the charger 20.

At 52, a test is made to determine whether a voltage difference was measured in step 50. If the test at 52 is logically false, indicating that no other appliance 36 in supply circuit 12 is drawing current, charger 20 is programmed to operate at its maximum charge rate, which is usually in the range of 1.0-1.2 Kw per hr.

But if the test at 52 has a true result, indicating that another appliance 36 in the supply circuit 12 is drawing current, at 56 a notice indicating that another load in circuit 12 is drawing current is transmitted to the operator through the charger 20. At 58, the charger 20 is programmed to operate at a lower charge rate than its maximum charge rate.

If the test at 52 has a false result, indicating that no other appliance is drawing current in the supply circuit 12, at step 54 the charger 20 is programmed to operate at its maximum charge rate.

At 62, a test is made to determine whether the battery is fully recharged or recharged to a desired, predetermined state of charge (SOC). If the result of test 62 is true, indicating that the recharge is completed, the recharge process ends at 64.

But if the result of test 62 is false, at 66 a test is made to determine whether the retest interval loaded at step 48 has expired. If the result of test 66 is true, indicating that it is time to retest whether another appliance 36 is drawing current in supply circuit 12, charger 20 stops recharging the battery 21 at any recharge rate, and control returns to 50 where the voltage across the charger from neutral to ground is again measured. But if the result of test 66 is false, control returns to 62 and recharging of the battery through charger 20 continues.

Figure 3:
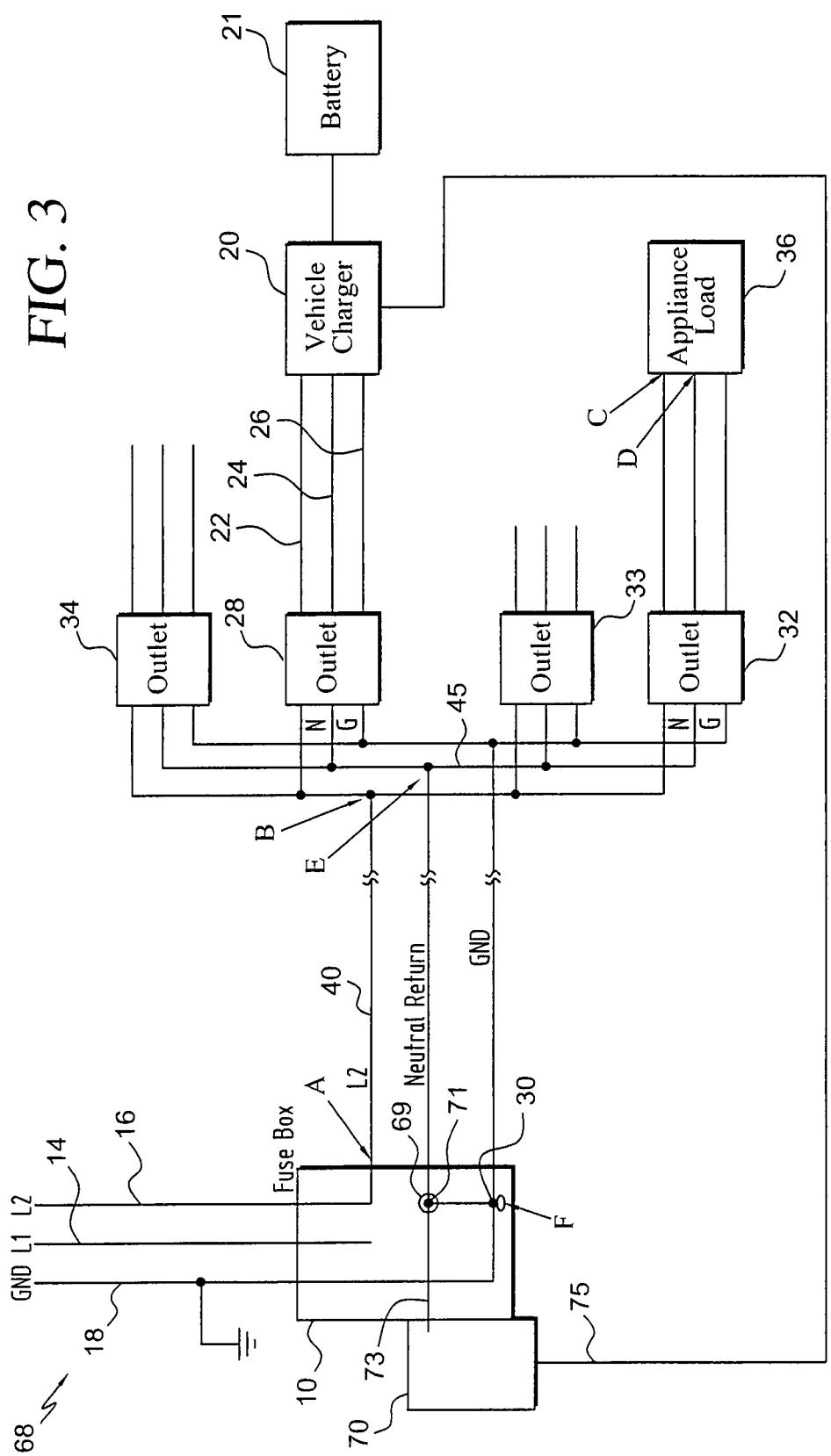
FIG. 3 is a schematic diagram of an alternate embodiment of an electrical distribution system.

FIG. 3 illustrates a power supply circuit 68 similar to circuit 12, in which electric power from an electric utility power grid is carried to a circuit distribution panel 10 of a residential or commercial site. In circuit 68, a current sensor 69 connected to terminal 71 produces a signal indicating the magnitude of current draw $I_{cir}$ in circuit 68. A monitor 70, preferably located at the panel 10 and coupled to current sensor 69 by a signal wire 73, transmits a signal on line 75 to charger 20 representing the current draw in circuit 68.

Figure 4:
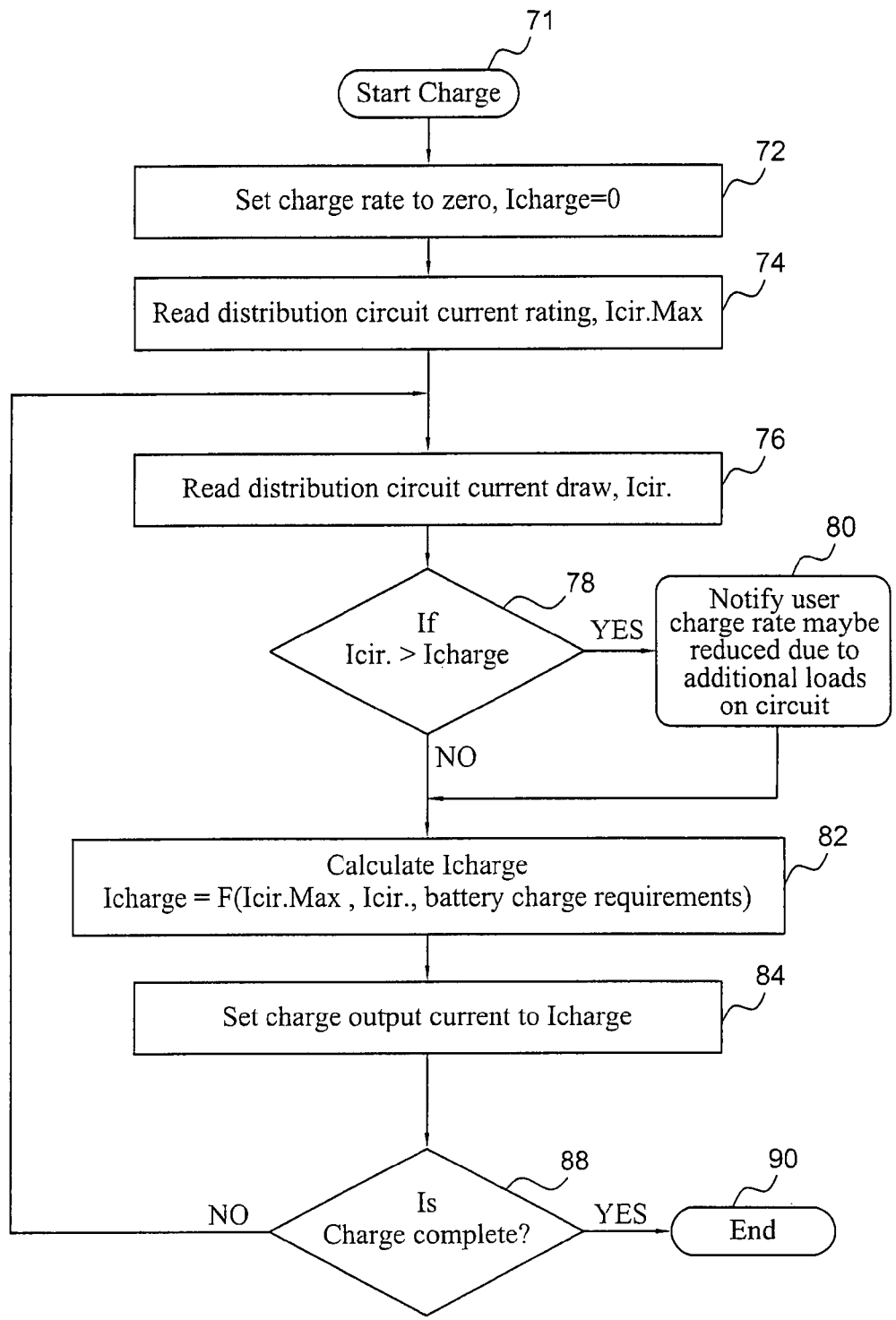
FIG. 4 is a schematic diagram illustrating the steps of an alternate method for charging an electric storage battery through a charger.

FIG. 4 illustrates the steps of an algorithm for controlling the charge procedure of battery 21 using the circuit 68 of FIG. 3. The recharge of the storage battery 21 starts at 71. At 72, the charge rate at which the battery is recharged $I_{charge}$ is set to zero. At 74, the current rating $I_{cir\ max}$ of the supply circuit 68 is read by the charger 20. At 76, the current $I_{cir}$ represented by the signal produced by current sensor 69 is read by the charger 20.

A test is made at 78 to determine whether current in circuit 68 $I_{cir}$ is greater than the recharge current $I_{charge}$. If the result of test 78 is true, indicating that an appliance 36 is drawing current, at 80 charger 20 displays a notice indicating that too much current is being drawn by an added appliance, and the current draw of the recharge may be reduced due to a load on circuit 68 in addition to that of the charger 20. If the charger is not charging at the maximum charge rate, the charge rate may not be reduced.

But if the result of test 78 is false, at 82 the rate of the battery recharge current is determined, preferably by a calculation that references $I_{cir\ max}$ and $I_{cir}$ and the maximum allowable rate at which the battery should be recharged. For example, if there is no additional appliance 36 in circuit 68, the battery can be recharged at its maximum capacity provided it does not exceed the current capacity rating of circuit 68. If there is an additional appliance 36 in circuit 68, the battery can be recharged at less than maximum capacity provided the current draw of the appliances 36 and charger 20 does not exceed the current capacity rating of circuit 68.

At 84, the $I_{charge}$ is set to the result of step 82, and the battery is recharged at the updated $I_{charge}$ rate.

At 88, a test is made to determine whether the battery is fully recharged or recharged to a desired, predetermined SOC. If the result of test 88 is true, indicating that the recharge is completed, the recharge process ends at 90.

But if the result of test 88 is false, control returns to step 76, where the sequential steps are repeated until the result test at 88 become true and the recharge ends at 90.

The battery recharging method described with reference to FIG. 4 interacts with a distribution system monitor 70 to obtain the current being drawn on the circuit 68 and its maximum allowable current. In addition, the supply circuit and power distribution system could also pass information, such as when to start the charge. The power distribution system could interact with a battery controller to determine the magnitude of energy required by the charger 20 and then participate in determining the best way for the charger to operate to obtain the lowest cost charge. This interaction can be accomplished through line 73, or wireless communication, or another method that is able to transfer the information.

Figure 5:
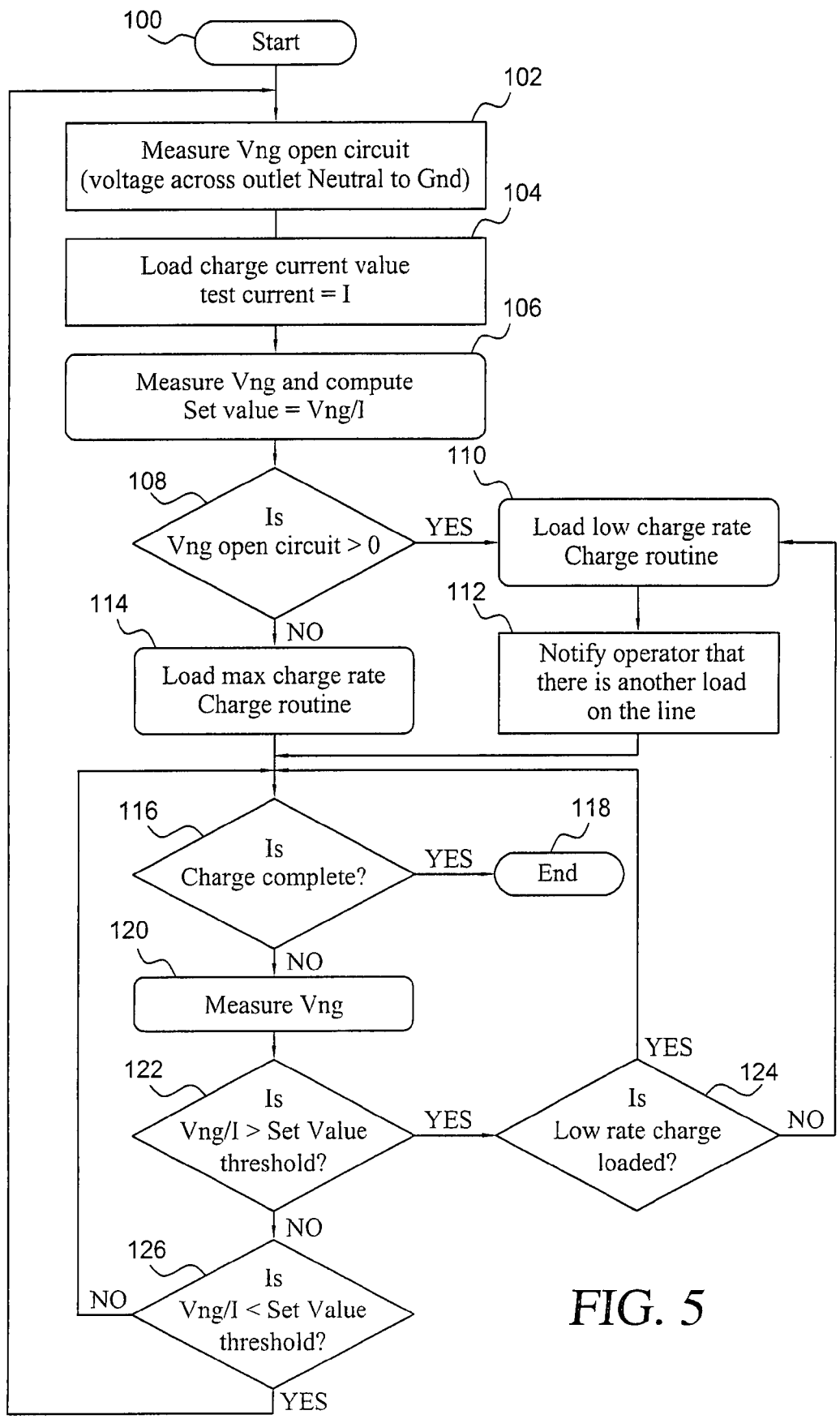
FIG. 5 is a schematic diagram illustrating the steps of a continuous adaptive battery charge control.

FIG. 5 illustrates the steps of an algorithm for a continuous adaptive battery charge control, which incorporates data sampling the wall plug neutral-to-ground voltage. The recharge of the storage battery 21 starts at 100. At 102, the open circuit voltage across the neutral to ground of outlet 28 $V_{ng}$ is sampled. At step 104, a charge current magnitude, i.e., a test current I, is loaded into the charger.

At 106, $V_{ng}$ is sampled again, and $V_{ng}/I$ is calculated and set equal to a set value representing impedance.

A test is made at 108 to determine whether $V_{ng}$ open circuit is greater than zero. If the result of test 108 is true, indicating that an appliance 36 is drawing current, at 110 a low charge rate is loaded in a charge routine that controls the charger. At 112, the operator is notified, preferably through charger 20, that there is another load on the line in addition to the charger.

If the result of test 108 is false, indicating that no appliance 36 other than charger 20 is drawing current, at 114 the maximum charge rate is loaded in the charge routine.

Regardless of the result of test 108, control passes to step 116 where a test is made to determine whether the charge of the battery is completed, preferably with reference to the battery's current state of charge. If the charge is completed, at 118 the charge is ended.

If test 116 indicates that the charge is incomplete, at step 120 $V_{ng}$ is sampled again.

A test is made at 122 to determine whether $V_{ng}/I$ is greater than the set value plus an incremental impedance value of about five percent of the set value. If the result of test 122 is true, indicating that an appliance 36 is drawing current, at 124 at test is made to determine whether the charger 20 is loaded with the low charge rate. If the test at 124 is false, control passes to step 110 where the low charge rate is loaded in charger 20. If the test at 124 is true, control passes to step 116.

If the result of test 122 is false, indicating that an appliance 36 is now drawing less current, at 126 a test is made to determine whether $V_{ng}/I$ is less than the set value plus a incremental impedance value of about five percent of the set value. If test 126 is true, control passes to step 102 and the algorithm is executed again. If test 126 is false, there is no change in the appliance load and control passes to step 116.

The battery recharging method described with reference to FIGS. 4 and 5 interacts with a distribution system monitor 70 to obtain the current being drawn on the circuit 68 and its maximum allowable current. In addition, the supply circuit and power distribution system could also pass information, such as when to start the charge. The power distribution system could interact with a battery controller to determine the magnitude of energy required by the charger 20 and then participate in determining the best way for the charger to operate to obtain the lowest cost charge.

In accordance with the provisions of the patent statutes, the preferred embodiment has been described. However, it should be noted that the alternate embodiments can be practiced otherwise than as specifically illustrated and described.

What is claimed is:

1. A method for charging an electric storage battery in a plug-in hybrid electric vehicle through a power supply circuit, comprising the steps of:
   (a) coupling the charger to the circuit;
   (b) determining whether another appliance in the circuit other than the charger is drawing current;
   (c) determining a maximum charge rate at which the battery can be charged using the charger;
   (d) charging the battery at the maximum charge rate if no other appliance in the circuit is drawing current;
   (e) charging the battery at less than the maximum charge rate if another appliance in the circuit is drawing current; and the power supply circuit receiving power from an electric utility power grid;
   wherein step (a) further includes coupling a vehicle charger to the circuit via an electric outlet receiving power from the grid;
   wherein step (b) further includes determining whether another appliance, unrelated to vehicle battery charging and located outside of the vehicle, in the circuit is drawing current from the grid;
   wherein step (d) further includes charging the battery at the maximum charge rate if no other appliance, unrelated to vehicle battery charging, in the circuit is drawing current from the grid;
   wherein step (e) further includes charging the battery at less than the maximum charge rate if another appliance, unrelated to vehicle battery charging, in the circuit is drawing current from the grid; and
   wherein the circuit includes the first outlet at which the charger is coupled to the circuit and draws power from the grid and a second outlet at which an appliance, unrelated to vehicle battery charging, can be coupled to the circuit and draw power from the grid, each outlet including a neutral terminal that is connected mutually at a first terminal, and a ground terminal that is connected mutually at a second terminal, wherein step (b) further includes the steps of:
   determining whether a first voltage is present between the neutral terminal and the ground terminal of the first outlet;
   performing step (d) if the first voltage is zero; and
   performing step (e) if the first voltage is not zero.

2. The method of claim 1, further including the steps of:
   determining a length of a reference period during which the battery can be charged before repeating step (b);
   continuing to charge the battery while the reference period is unexpired;
   discontinuing the step of charging the battery when the reference period expires; and
   repeating steps (b) through (e) after the discontinuing step.

3. The method of claim 1, further comprising the steps of:
   determining repeatedly the current state of charge of the battery;
   comparing repeatedly a reference state of charge to the current state of charge;
   continuing to charge the battery while the current state of charge is less than the reference state of charge;
   determining a length of a reference period during which the battery can be charged before repeating step (b);
   continuing to charge the battery while the reference period is unexpired;
   discontinuing the step of charging the battery when the reference period expires or the current state of charge is equal to or greater than the reference state of charge.

4. The method of claim 3, further comprising the step of:
   repeating steps (b) through (e) after the discontinuing step.

5. The method of claim 1, wherein the circuit includes a current sensor for indicating a magnitude of current in the circuit, and wherein step (b) further includes the steps of:
   using the current sensor to determine a magnitude of current drawn by an appliance other than the charger in the circuit;
   performing step (d) if the current sensor indicates that no current is being drawn in the circuit by an appliance other than the charger; and performing step (e) if the current sensor indicates that current is being drawn in the circuit by an appliance unrelated to vehicle battery charging other than the charger.

6. A method for charging an electric storage battery in a plug-in hybrid electric vehicle through a power supply circuit, comprising the steps of:
(a) coupling the charger to the circuit;
(b) determining whether another appliance in the circuit other than the charger is drawing current;
(c) determining a maximum charge rate at which the battery can be charged using the charger;
(d) charging the battery at the maximum charge rate if no other appliance in the circuit is drawing current; and
(e) charging the battery at less than the maximum charge rate if another appliance in the circuit is drawing current; and
the power supply circuit receiving power from an electric utility power grid;
wherein step (a) further includes coupling a vehicle charger to the circuit via an electric outlet receiving power from the grid;
wherein step (b) further includes determining whether another appliance, unrelated to vehicle battery charging and located outside of the vehicle, in the circuit is drawing current from the grid;
wherein step (d) further includes charging the battery at the maximum charge rate if no other appliance, unrelated to vehicle battery charging, in the circuit is drawing current from the grid;
wherein step (e) further includes charging the battery at less than the maximum charge rate if another appliance, unrelated to vehicle battery charging, in the circuit is drawing current from the grid; and
wherein the circuit includes the first outlet at which the charger is coupled to the circuit and draws power from the grid and a second outlet at which an appliance unrelated to vehicle battery charging can be coupled to the circuit and draw power from the grid, each outlet including a neutral terminal that is connected mutually at a first terminal, and a ground terminal that is connected mutually at a second terminal, wherein step (b) further includes the steps of:
determining whether a first voltage is present between the neutral terminal and the ground terminal of the first outlet;
performing step (d) if the first voltage is zero; and
performing step (e) if a voltage difference between the first terminal and the second terminal is greater than a reference voltage difference.

7. The method of claim 6, further including the steps of:
determining a length of a reference period during which the battery can be charged before repeating step (b);
continuing to charge the battery while the reference period is unexpired;
discontinuing the step of charging the battery when the reference period expires; and
repeating steps (b) through (e) after the discontinuing step.

8. The method of claim 6, further comprising the steps of:
determining repeatedly the current state of charge of the battery;
comparing repeatedly a reference state of charge to the current state of charge;
continuing to charge the battery while the current state of charge is less than the reference state of charge;
determining a length of a reference period during which the battery can be charged before repeating step (b);
continuing to charge the battery while the reference period is unexpired;
discontinuing the step of charging the battery when the reference period expires or the current state of charge is equal to or greater than the reference state of charge.

9. The method of claim 8, further comprising the step of:
repeating steps (b) through (e) after the discontinuing step.

10. The method of claim 6, wherein the circuit includes a current sensor for indicating a magnitude of current in the circuit, and wherein step (b) further includes the steps of:
using the current sensor to determine a magnitude of current drawn by an appliance other than the charger in the circuit;
performing step (d) if the current sensor indicates that no current is being drawn in the circuit by an appliance other than the charger; and
performing step (e) if the current sensor indicates that current is being drawn in the circuit by an appliance unrelated to vehicle battery charging other than the charger.

11. A method for charging an electric storage battery in a plug-in hybrid electric vehicle through a power supply circuit, comprising the steps of:
(a) coupling the charger to the circuit;
(b) determining whether another appliance in the circuit other than the charger is drawing current;
(c) determining a maximum charge rate at which the battery can be charged using the charger;
(d) charging the battery at the maximum charge rate if no other appliance in the circuit is drawing current; and
(e) charging the battery at less than the maximum charge rate if another appliance in the circuit is drawing current; and
the power supply circuit receiving power from an electric utility power grid;
wherein step (a) further includes coupling a vehicle charger to the circuit via an electric outlet receiving power from the grid;
wherein step (b) further includes determining whether another appliance, unrelated to vehicle battery charging and located outside of the vehicle, in the circuit is drawing current from the grid;
wherein step (d) further includes charging the battery at the maximum charge rate if no other appliance, unrelated to vehicle battery charging, in the circuit is drawing current from the grid;
wherein step (e) further includes charging the battery at less than the maximum charge rate if another appliance, unrelated to vehicle battery charging, in the circuit is drawing current from the grid; and
further comprising the steps of:
periodically determining the current state of charge of the battery;
comparing a reference state of charge to the current state of charge; and
discontinuing the step of charging the battery when the current state of charge is equal to or greater than the reference state of charge.

12. The method of claim 11, further including the steps of:
determining a length of a reference period during which the battery can be charged before repeating step (b);
continuing to charge the battery while the reference period is unexpired;
discontinuing the step of charging the battery when the reference period expires; and
repeating steps (b) through (e) after the discontinuing step.

13. The method of claim 11, further comprising the steps of:
- determining repeatedly the current state of charge of the battery;
- comparing repeatedly a reference state of charge to the current state of charge;
- continuing to charge the battery while the current state of charge is less than the reference state of charge;
- determining a length of a reference period during which the battery can be charged before repeating step (b);
- continuing to charge the battery while the reference period is unexpired;
- discontinuing the step of charging the battery when the reference period expires or the current state of charge is equal to or greater than the reference state of charge.

14. The method of claim 13, further comprising the step of:
repeating steps (b) through (e) after the discontinuing step.

15. The method of claim 11, wherein the circuit includes a current sensor for indicating a magnitude of current in the circuit, and wherein step (b) further includes the steps of:
- using the current sensor to determine a magnitude of current drawn by an appliance other than the charger in the circuit;
- performing step (d) if the current sensor indicates that no current is being drawn in the circuit by an appliance other than the charger; and
- performing step (e) if the current sensor indicates that current is being drawn in the circuit by an appliance unrelated to vehicle battery charging other than the charger.

* * * * *